Sept. 25, 1951  C. H. SPARKLIN ET AL  2,568,773
FOOD MIXER
Filed Dec. 20, 1946  3 Sheets-Sheet 1
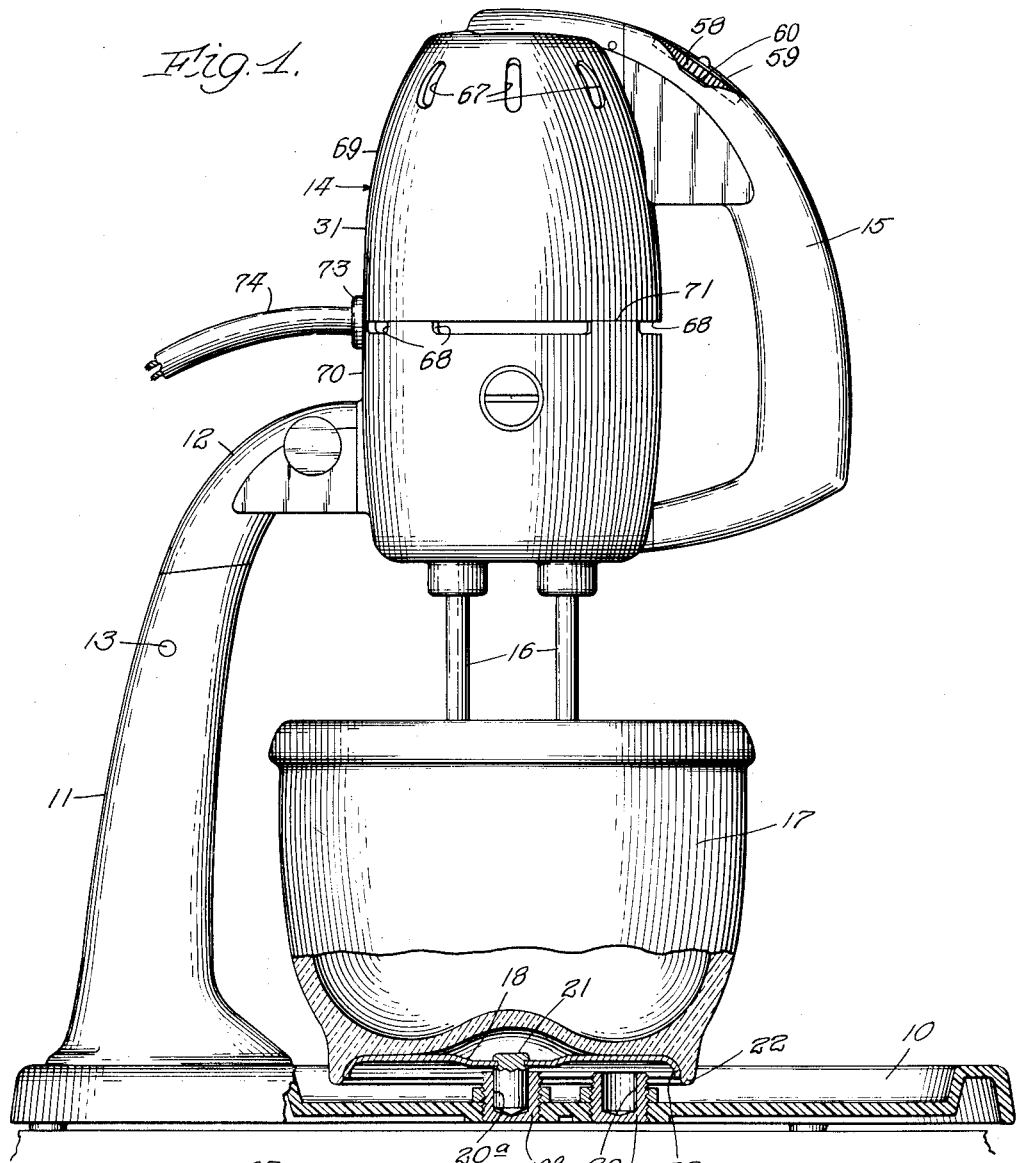
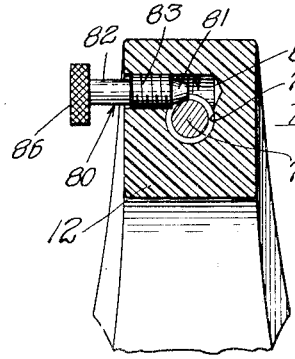

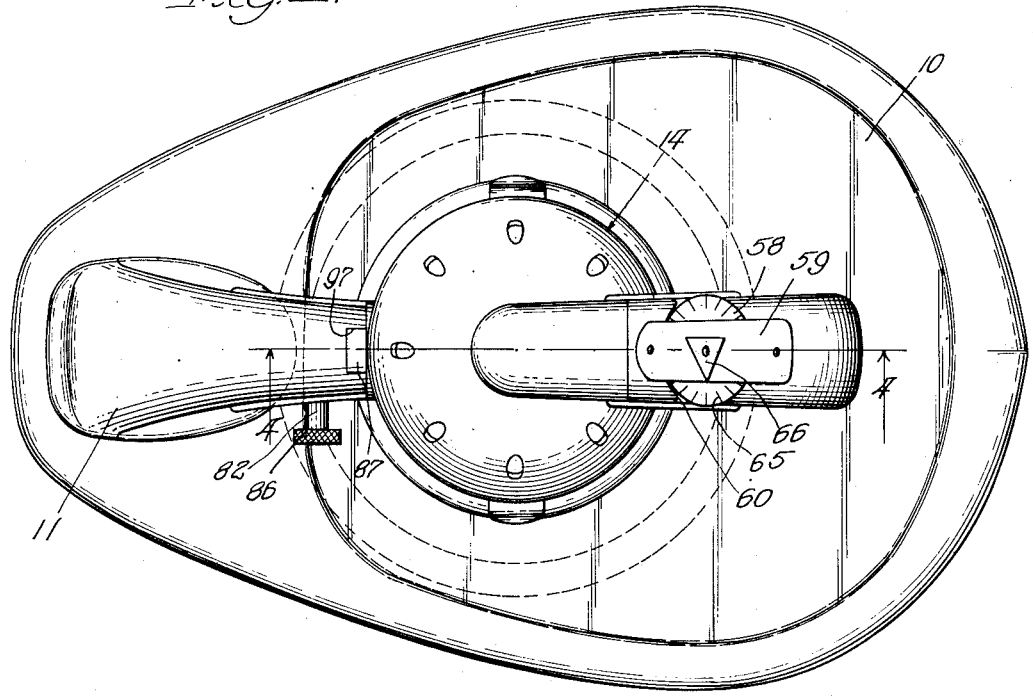
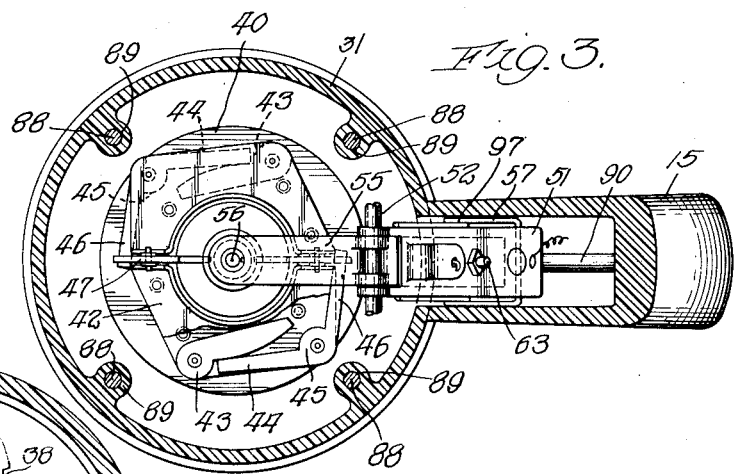
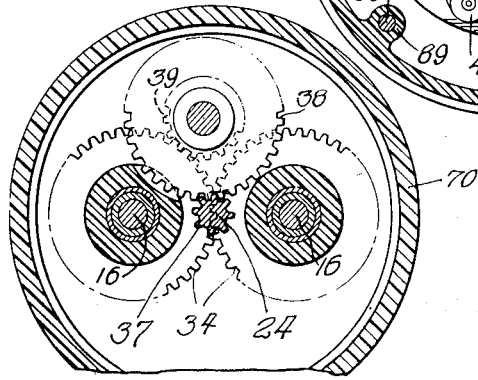

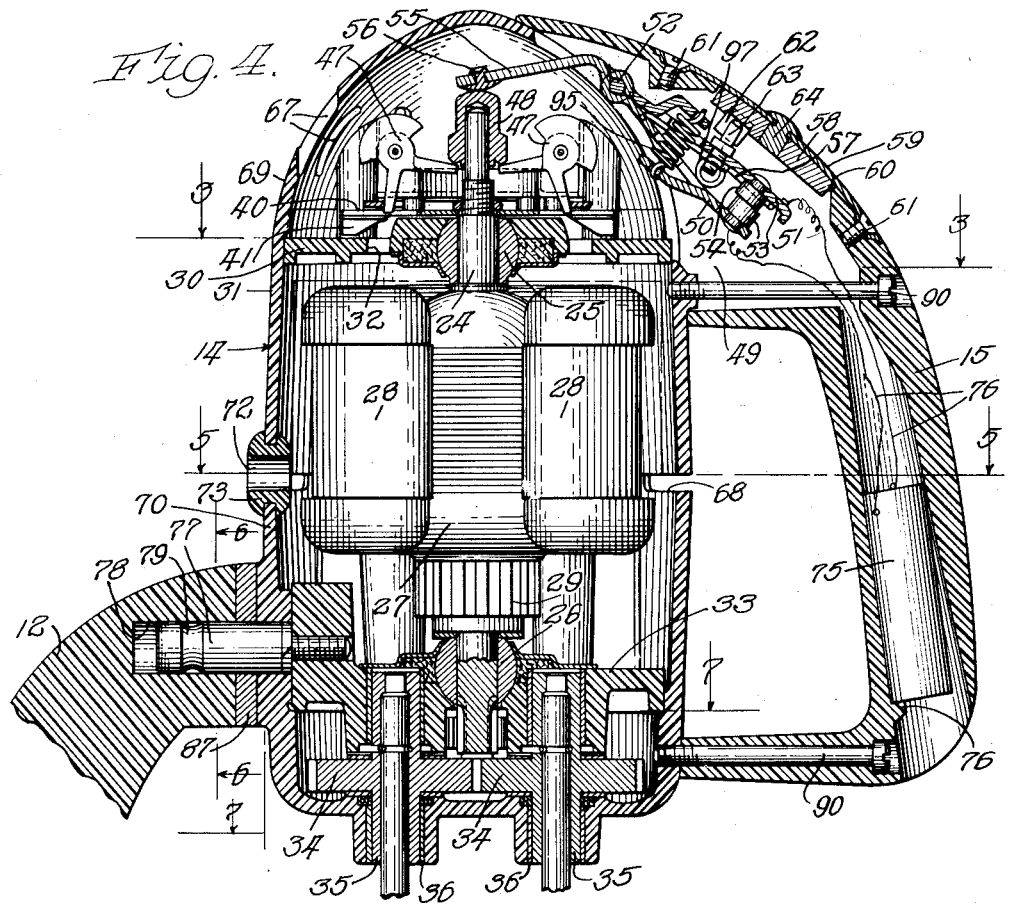
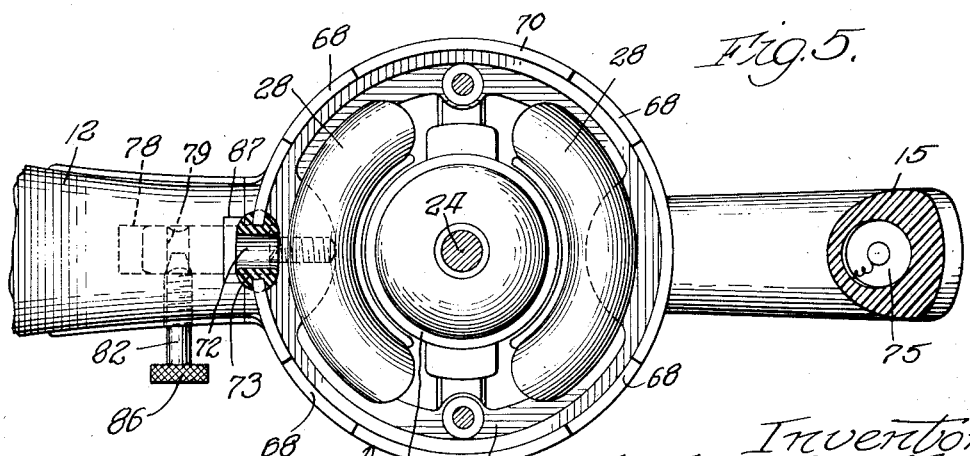

Patented Sept. 25, 1951

2,568,773

UNITED STATES PATENT OFFICE 2,568,773

FOOD MIXER

Charles H. Sparklin and George C. Sporney, Chicago, Ill., assignors to Birtman Electric Company, a corporation of Illinois Application December 20, 1946, Serial No. 717,478

11 Claims. (Cl. 200—80)

This invention relates to a variable speed motor of the type adapted to be used on food mixers and the like, and relates also to an improved means for mounting a motor member on a mounting member such as a pedestal.

The motor, which is a part of this invention, is particularly adaptable for use on food mixers and the like. The motor is quite compact in construction and is provided with a variable speed control that operates over a wide speed range. The motor is provided with a handle preferably extending longitudinally of the motor casing and joined thereto by an enlarged hollow section. The speed control means is preferably located in this hollow section with the member used for setting the speed being located on the outer surface of the hollow section in finger-manipulative position. This improved motor, when used on a food mixer, provides a substantially constant speed at any speed setting over a wide range. It may be mounted on a mounting member such as an upstanding arm and employed like an ordinary mixer in beating materials located in a container beneath the motor. The motor member may also be grasped by the handle and removed from its mounting member so that it can be operated independently of its mounting. Thus food heating on a stove may be mixed while the cook holds the mixer in her hand. Improved means are provided for readily mounting the motor on the upstanding arm and for readily dismounting the motor therefrom. These improved means also form a part of this invention.

One of the important features of this invention is the compactness of the motor member. This compactness is provided by having the principal portion of the speed regulating means located in the enlarged hollow portion at the base of the handle and by making the remainder of the handle also hollow so that a condenser or the like may be located in this latter hollow portion. The control means by which the speed is regulated is preferably mounted in the enlarged hollow portion of the handle and is located with its top surface substantially flush with the outer handle surface and with the edges extending beyond the outer surface so that these edges may readily be grasped by the fingers.

The invention will be described as related to one embodiment of the same as set out in the accompanying drawings. Of the drawings, Fig. 1 is an elevation, partially in section, of the food mixer embodying the invention; Fig. 2 is a plan view of the mixer of Fig. 1; Fig. 3 is a horizontal section partially broken away and taken along line 3—3 of Fig. 4; Fig. 4 is a fragmentary vertical section taken along line 4—4 of Fig. 2; Fig. 5 is a horizontal section taken along line 5—5 of Fig. 4; Fig. 6 is a vertical section taken along line 6—6 of Fig. 4; and Fig. 7 is a section taken along line 7—7 of Fig. 4.

The food mixer is shown in the accompanying drawings comprises a base member 10 and upstanding arm 11 at one end thereof, a top portion 12 on the upstanding arm and hingedly attached thereto around a hinge pin 13, a motor member 14 attached to the top portion 12 and having a longitudinally extending handle 15 opposite the top portion 12 of the mounting arm, a pair of depending beater shafts 16 extending from the motor member 14, a bowl 17 for holding materials to be beaten, and a rotatable platform 18 supporting the bowl 17.

The base member 10 is adapted to support bowls of different diameters. It is provided with a stud member 19 having a cylindrical bearing opening 20 therein and at least a second stud member 19a having a similar bearing opening at 20a therein. These bearing openings are adapted to receive a cylindrical bearing 21 such as is located on the bottom of the rotatable platform 18. As shown, the bearing 21 is located in the bearing opening 20a and supports the platform 18 with the bowl thereon. The rotation of the beaters causes rotation of the bowl 17. A larger bowl may be used by using a larger platform and mounting it in the bearing opening 20. The bowl 17 is provided with a downwardly extending bottom circular flange 22 and is supported by downwardly extending peripheral flanges 23 on the platform 18.

The motor member 14 comprises a vertical shaft 24 held in bearings 25 and 26 and armature 27 on the shaft, field coils 28 adjacent the armature 27, and a commutator 29 beneath the armature 27. The upper bearing 25 is held in a horizontal plate 30 extending across the motor casing 31 with the plate being provided with spaced holes 32 therein. The bottom bearing 26 is held in a gear casing 33. Within the gear casing 33, there is located a pair of horizontally aligned meshing gears 34 with each gear being formed with a cylindrical central portion 35. Each cylindrical portion is rotatably mounted in a bearing 36 and is hollow so as to receive and hold a beater shaft 16. A small gear 37 is formed on the end of the vertical shaft 24 and engages a larger gear 38. A smaller gear 39 is mounted concentrically with the gear 38 and is driven thereby. This smaller gear 39 meshes with one of the main gears 34 to drive the beater shafts 16.

Mounted on the top end of the motor shaft 24 beyond the top bearing 25 there is located a rotatable horizontal plate 40. On the bottom surface of this rotatable plate are located radial fins 41 serving as fan blades when the rotatable plate 40 is rotated. On top of the plate 40 there is located a second plate 42 spaced from the first plate 40. Between the two plates 40 and 42 are located centrifugally responsive lever arms 43 rotatably mounted at one end thereof. Each lever arm 43 bears against one arm 44 of a bell crank also located between the two parallel plates 40 and 42. The other arm 46 of each bell crank bears against one arm of a second bell crank 47 mounted on the second plate 42 and at substantially right angles thereto. The second bell cranks 47 have their other legs extending toward the motor shaft 24 and are adapted to bear against a member 48 slidably mounted on the upper end of the motor shaft 24. The lever arms 43, bell cranks 45, and second bell cranks 47 are arranged so that as the speed of the motor increases, the member 48 is moved outwardly on the shaft 24 by the centrifugal forces set up in the lever arms 43. This construction of the speed control means is shown and described in greater detail in the Charles H. Sparklin copending application No. 580,114, filed February 28, 1945, now Patent Number 2,532,345, issued December 5, 1950.

The handle 15 has an enlarged hollow portion 49 at its upper end thereof in communication with the top of the motor casing 31. In this hollow portion is located a pair of contact arms comprising a lower arm 50 and an upper arm 51. These arms are rotatably mounted about a fulcrum 52 also located within the hollow portion 49. The free ends of the arms 50 and 51 are provided with cooperating contact points 53 and 54. The arms 50 and 51 are normally held in contact with each other by a tension spring 95. The lower contact arm 50 is provided with an outwardly extending lever arm 55 extending beyond the fulcrum 52 to a point adjacent the outer end of the movable member 48 on the end of the shaft 24. The outer end of the lever arm 55 is provided with a button 56 for contacting the member 48. A U-shaped spring 57 is provided with the base of the U bearing against the outer end of the upper contact arm 51 and the prongs of the spring imbedded in the upper casing section 69 adjacent the hollow portion 49. Each prong of the spring is formed with a coil 97 intermediate its ends in order to give the spring greater resiliency.

In order to regulate the speed of the motor, the contact arms 50 and 51 are movable to different positions around their fulcrum 52. As shown, this movement is caused by rotating a circular disk 58 rotatably mounted on a thin strip of metal 59 fastened across an opening 60 in the upper surface of the hollow portion 49. This strip of metal 59 is held by screws 61 so that the top surface of the disk 58 is substantially flush with the outer surface of the top of the hollow portion 49, but with the edges of the disk extending beyond the hollow portion 49 so as to be readily grasped by the fingers. The bottom of the disk 58 is provided with a cam surface 62 adapted to bear against a stud 63 mounted on the upper contact arm 51. The spring 57 holds the stud 63 against the cam surface 62 and urges the contact arms 50 and 51 toward a low speed position. As the disk 58 is rotated about its central mounting, the cam surface 62 causes movement of the contact arms 50 and 51 about their fulcrum 52. As the speed of the motor depends upon the position of the contact arms 50 and 51, this movement serves to regulate the speed of the motor. When the contact arms are in the position shown in Fig. 4, the motor is operating at substantially its lowest speed. The arms 50 and 51 are so arranged that when the stud 63 is at the lowest point on the cam surface 62, the contact points 53 and 54 will be separated so that no current flows between them. This is the "off" position for the motor. The outer surface of the disk 58 is preferably provided with a graduated scale 65 that can be aligned with the tip of a pointer 66 on the metal mounting strip 59.

The motor casing 31 is provided with upper ventilating openings 67 and lower ventilating openings 68. Cooling air is thereby circulated through the openings 67 and 68 and openings 32 in the plate 30 by means of the fan blades 41. The motor casing 31 is divided into an upper portion 69 and a lower portion 70 along a horizontal line 71. This horizontal line forms one side of the lower ventilating openings 68. The two casing sections 69 and 70 form a circular hole 72 at the one point supporting a collar 73 of a resilient material such as rubber through which the electric cord 74 extends. Cooperating semi-circular openings may be formed in the two casing sections, as shown, or one casing section may contain the hole and the other casing section merely be straight and form one side thereof.

The handle 15 is preferably made hollow so as to provide a housing for a condenser 75 located within the handle 15. This condenser is connected by wires 76, or the like, across the contact points 53 and 54 to reduce sparking between the points. The condenser 75 has its bottom surface resting on a stud 76 located on the inner surface of the handle 15.

In order that the motor member 14 may be readily mounted on the top portion 12 of the upstanding arm 11, the motor member is provided with a non-cylindrical projection such as rectangular projection 87 upon which is mounted a substantially cylindrical projection 77. The projections are adapted to be held within similarly shaped slot 97 and cylindrical socket 78, respectively, in the top portion 12. The cylindrical projection 77 is provided with a circumferential groove 79 near its outer end arranged substantially at right angles to the axis of the cylindrical projection. Arranged at the top of the socket 78 and aligned with the groove 79 when the projections are in place, there is located a cam member 80 adapted to be moved into and out of engagement with the groove 79. This cam member has a contacting surface 81 in the shape of a frustrum of a cone. The base of the frustrum is attached to a cylindrical member 82 provided with screw threads 83 engaging the threads in a threaded hole 84. The outer end of the cylindrical member 82 is provided with a head 86 which may be grasped by the fingers. As the head 86 is turned in one direction, the frustrum 81 is moved out of engagement with the groove 79 so that the projections 77 and 87 may be withdrawn from the socket 78 and slot 97. When the projections are re-inserted in the socket and slot, the head 86 may be turned in the opposite direction to move the frustrum into engagement with the groove 79 and lock the projection 77 within the socket 78. The projection 77 serves to hold the motor member in place and the projection 87 serves to prevent rotation of the motor member.

The two sections 69 and 70 of the motor casing 31 are held by spaced vertical bolts 88 extending through mounting blocks 89. The handle 15 is held in place by bolts 90 extending between the outer surface of the handle 15 and the motor casing 31. As can be seen from Fig. 4, the lower bolt 90 has its head within the central hollow of the section of the handle 15.

Having described our invention as related to the embodiment set out in the accompanying drawings, it is our intention that the invention be not limited by any of the details of description unless otherwise specified, but rather be construed broadly within its spirit and scope as set out in the accompanying claims.

We claim:

1. In an apparatus including a rotatable shaft, a rotatable member operated by the shaft, speed responsive means on the rotatable member, a movable member operated by the speed responsive means and movable relative to the rotatable member as the speed is changed, a casing for the apparatus, apparatus comprising: a handle spaced laterally from the casing and having an enlarged hollow connecting section at one end of the casing, a make-and-break switch located within the hollow section mounted for rotation about a fulcrum and including a pair of arms carrying cooperating contact points, a lever arm attached to one of the contact arms and extending beyond the fulcrum to a point adjacent the movable member, means for causing separation of the contact arms when the movable member moves the lever arm, means for changing the position of the contact arms about the fulcrum, and means normally urging the contact arms together.

2. The apparatus of claim 1 wherein the fulcrum is also located within said enlarged section.

3. The apparatus of claim 1 wherein the means for changing the position of the contact arms comprises a finger-manipulative member located on the outer surface of said enlarged section.

4. The apparatus of claim 1 wherein the contact arms are arranged with one nearer the shaft than the other and the lever arm is attached to the contact arm nearer the shaft.

5. The apparatus of claim 1 wherein there is provided a spring means urging the contact arms toward a low speed position.

6. The apparatus of claim 1 wherein the hollow section is located at the end of the casing adjacent the rotatable member, the fulcrum is positioned within the hollow section, and the contact arms lie at an acute angle to the shaft, whereby movement of the lever arm away from the shaft causes movement of the contact arms toward the shaft.

7. In an apparatus including a rotatable shaft, a rotatable member operated by the shaft, speed responsive means on the rotatable member, a movable member operated by the speed responsive means and movable away from the rotatable member as the speed is increased, and a casing for said apparatus, apparatus comprising: a handle spaced laterally from the casing and joined thereto by an enlarged hollow section at the end of the casing adjacent said rotatable member, a make-and-break switch in the hollow section mounted for rotation about a fulcrum and including a pair of arms carrying cooperating contact points, with one of said arms being located nearer the end of the shaft opposite the rotatable member than the other, a lever arm rigidly attached to said nearer arm and extending beyond the fulcrum to a point adjacent the movable member, a spring means bearing against the farther contact arm for urging the contact arms toward a low speed position, means for changing the position of the contact arms about the fulcrum, and means normally urging the contact arms together.

8. The apparatus of claim 7 wherein the fulcrum is also located within said hollow section.

9. The apparatus of claim 7 wherein the means for changing the position of the contact arms comprises a finger-manipulative member located on the outer surface of said enlarged section.

10. In an apparatus including a rotatable shaft, a rotatable member operated by the shaft, speed responsive means on the rotatable member, a movable member operated by the speed responsive means and movable away from the rotatable member as the speed is increased, and a casing for said apparatus, apparatus comprising: a handle spaced laterally from the casing and joined thereto by an enlarged hollow section at the end of the casing adjacent said rotatable member, a make-and-break switch in the hollow section mounted for rotation about a fulcrum also located in the hollow section and including a pair of arms carrying cooperating contact points, with one of said arms being located nearer the end of the shaft opposite the rotatable member than the other, a lever arm rigidly attached to said nearer arm and extending beyond the fulcrum to a point adjacent the movable member, a spring means having one end bearing against the inner surface of the farther contact arm for urging the contact arms toward a low speed position, means normally urging the contact arms together, and means for changing the position of the contact arms about the fulcrum.

11. In a speed control apparatus including a casing and a handle therefor, a speed control member capable of being rotated to vary the speed and comprising a rotatable member located in an opening in the handle and having its top surface substantially flush with the top surface of the handle, said rotatable member having sides extending beyond the side of the handle to provide for finger manipulation.

CHARLES H. SPARKLIN.
GEORGE C. SPORNEY.

REFERENCES CITED

The following references are of record in the file of this patent:

UNITED STATES PATENTS

| Number | Name | Date |
|---|---|---|
| 1,932,747 | Mross | Oct. 31, 1933 |
| 2,092,995 | Chamberlain | Sept. 14, 1937 |
| 2,188,559 | Taylor | Jan. 30, 1940 |
| 2,241,528 | Strauss et al. | May 13, 1941 |
| 2,427,099 | Kennedy | Sept. 9, 1947 |
| 2,455,026 | Seyfred | Nov. 30, 1948 |